(12) United States Patent
Wu et al.

(10) Patent No.: US 10,978,943 B2
(45) Date of Patent: Apr. 13, 2021

(54) SYSTEM AND METHOD FOR AUTO-RAMPING AND ENERGY DUMP FOR A SUPERCONDUCTING WIND TURBINE GENERATOR

(71) Applicant: General Electric Company, Schenectady, NY (US)

(72) Inventors: Anbo Wu, Clifton Park, NY (US); Michael Parizh, Niskayuna, NY (US); Ernst Wolfgang Stautner, Niskayuna, NY (US); Minfeng Xu, Ballston Lake, NY (US); James William Bray, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/373,921

(22) Filed: Apr. 3, 2019

(65) Prior Publication Data
US 2020/0321847 A1 Oct. 8, 2020

(51) Int. Cl.
*F03D 9/00* (2016.01)
*H02P 9/04* (2006.01)
(Continued)

(52) U.S. Cl.
CPC ............ *H02K 55/04* (2013.01); *F03D 9/25* (2016.05); *H01F 6/02* (2013.01); *H01F 6/04* (2013.01);
(Continued)

(58) Field of Classification Search
CPC .................. H01F 6/02; H02K 55/04
See application file for complete search history.

(56) References Cited

U.S. PATENT DOCUMENTS 904,607 A 11/1908 Elmblad
5,627,709 A 5/1997 Salasoo
(Continued)

FOREIGN PATENT DOCUMENTS

EP 2 104 198 A2 9/2009
WO WO2014/044007 A1 3/2014

OTHER PUBLICATIONS

Steinmeyer et al., Toward the Invisible Cryogenic System for Magnetic Resonance Imaging, AIP Conference Proceedings, vol. 613, May 12, 2002, pp. 1659-1666. (Abstract Only) https://doi.org/10.1063/1.1472203.

(Continued)

*Primary Examiner* — Tulsidas C Patel
*Assistant Examiner* — Thomas K Quigley
(74) *Attorney, Agent, or Firm* — Dority & Manning, P.A.

(57) ABSTRACT

A wind turbine power generating system and method includes a tower, a hub, a plurality of blades connected to the hub, and a rotor connected to the hub. A superconducting generator is coupled to the rotor and includes a plurality of superconductive coils. A nacelle is mounted atop the tower, with the superconducting generator housed within the nacelle. An automatic ramp-down system is configured with the superconducting coils and includes an automatically activated energy dump circuit for current withdrawn from the superconductive coils in a ramp-down process prior to a quench. The energy dump circuit includes one or more heat dissipating loads, wherein each of the heat dissipating loads is mounted in thermal communication with one of the tower or the nacelle that act a thermal heat sink for dispersing heat from the loads.

13 Claims, 5 Drawing Sheets

(51) Int. Cl.
*H02K 55/04* (2006.01)
*F03D 9/25* (2016.01)
*H01F 6/02* (2006.01)
*H01F 6/04* (2006.01)
*H02K 7/18* (2006.01)

(52) U.S. Cl.
CPC ........ *H02K 7/1838* (2013.01); *F05B 2260/80* (2013.01); *F05B 2270/337* (2013.01)

(56) References Cited

U.S. PATENT DOCUMENTS

| | | | |
|---|---|---|---|
| 6,676,122 B1 * | 1/2004 | Wobben | F03D 80/60 |
| | | | 290/55 |
| 6,924,565 B2 | 8/2005 | Wilkins et al. | |
| 7,013,203 B2 | 3/2006 | Moore et al. | |
| 7,071,579 B2 | 7/2006 | Erdman et al. | |
| 7,095,597 B1 | 8/2006 | Cousineau | |
| 7,166,928 B2 | 1/2007 | Larsen | |
| 7,245,037 B2 | 7/2007 | Angquist et al. | |
| 7,298,602 B2 | 11/2007 | Knight | |
| 7,567,160 B2 | 7/2009 | Folts et al. | |
| 7,923,862 B2 | 4/2011 | Cardinal et al. | |
| 8,027,139 B2 | 9/2011 | Beier | |
| 8,482,369 B2 | 7/2013 | Wang et al. | |
| 8,542,015 B2 | 9/2013 | Lvovsky et al. | |
| 8,653,685 B2 | 2/2014 | Garcia | |
| 8,664,800 B2 | 3/2014 | Galbraith et al. | |
| 8,847,562 B2 | 9/2014 | Agudo Araque | |
| 9,214,883 B2 | 12/2015 | Kim et al. | |
| 9,236,742 B2 | 1/2016 | Garcia | |
| 9,366,233 B2 | 6/2016 | Bech et al. | |
| 9,407,186 B2 | 8/2016 | Babazadeh et al. | |
| 9,419,439 B2 | 8/2016 | Nielsen | |
| 9,556,852 B2 | 1/2017 | Babazadeh et al. | |
| 9,556,853 B2 | 1/2017 | Gupta et al. | |
| 9,660,448 B2 | 5/2017 | Ellena et al. | |
| 9,874,618 B2 | 1/2018 | Lvovsky et al. | |
| 9,985,426 B2 | 5/2018 | Jonas et al. | |
| 2006/0176132 A1 * | 8/2006 | Atkins | H01F 6/02 |
| | | | 335/216 |
| 2006/0197637 A1 * | 9/2006 | Mallett | H02H 7/001 |
| | | | 335/216 |
| 2007/0117478 A1 * | 5/2007 | Frauenhofer | H02K 9/19 |
| | | | 440/6 |
| 2009/0103217 A1 * | 4/2009 | Langtry | G01R 33/288 |
| | | | 361/19 |
| 2014/0175887 A1 | 6/2014 | Shao et al. | |
| 2014/0185165 A1 * | 7/2014 | Rajput-Ghoshal | H02H 7/001 |
| | | | 361/19 |
| 2015/0111753 A1 * | 4/2015 | Nakagawa | H01F 6/04 |
| | | | 505/163 |
| 2016/0187439 A1 * | 6/2016 | Lvovsky | G01R 33/288 |
| | | | 324/309 |
| 2016/0268940 A1 | 9/2016 | Achilles et al. | |
| 2017/0025858 A1 | 1/2017 | Garcia et al. | |
| 2017/0328969 A1 | 11/2017 | Biber | |
| 2017/0363697 A1 * | 12/2017 | Jonas | H01F 6/06 |
| 2018/0348318 A1 * | 12/2018 | Menteur | H01F 6/04 |

OTHER PUBLICATIONS

Ghoshal et al., Superconducting Magnet Power Supply and Hard-Wired Quench Protection at Jefferson Lab for 12 GeV Upgrade, EEE Transactions on Applied Superconductivity, vol. 27, Issue 8, Dec. 2017, pp. 1-6. (Abstract Only).

Herman ten Kate, Superconducting Magnets Quench Propagation and Protection, CERN Accelerator School on Superconductivity for Accelerators, Erice 2013, pp. 1-18.

Fair et al., Superconductivity for Large Scale Wind Turbines, Technical Report, General Electric—Global Research, U.S. Department of Energy, Office of Scientific and Technical Information, 2012, 2 Pages. (Abstract Only) https://www.osti.gov/biblio/1052970.

EPO Search Report, dated Aug. 7, 2020.

* cited by examiner

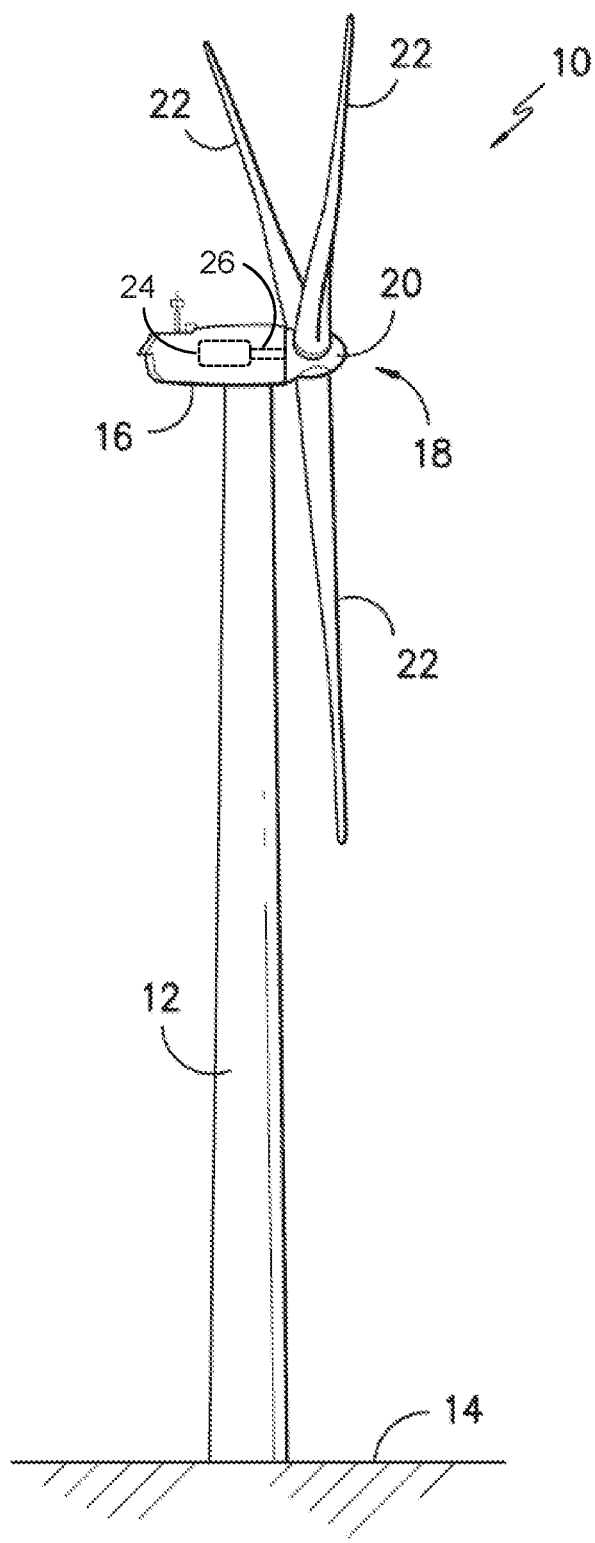
FIG. -1-

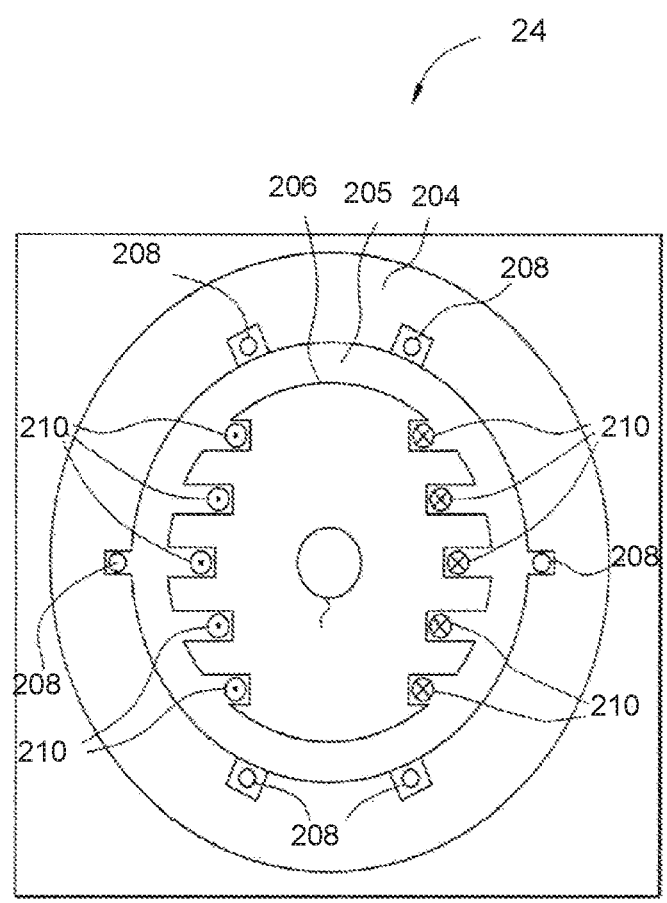
FIG. -2-

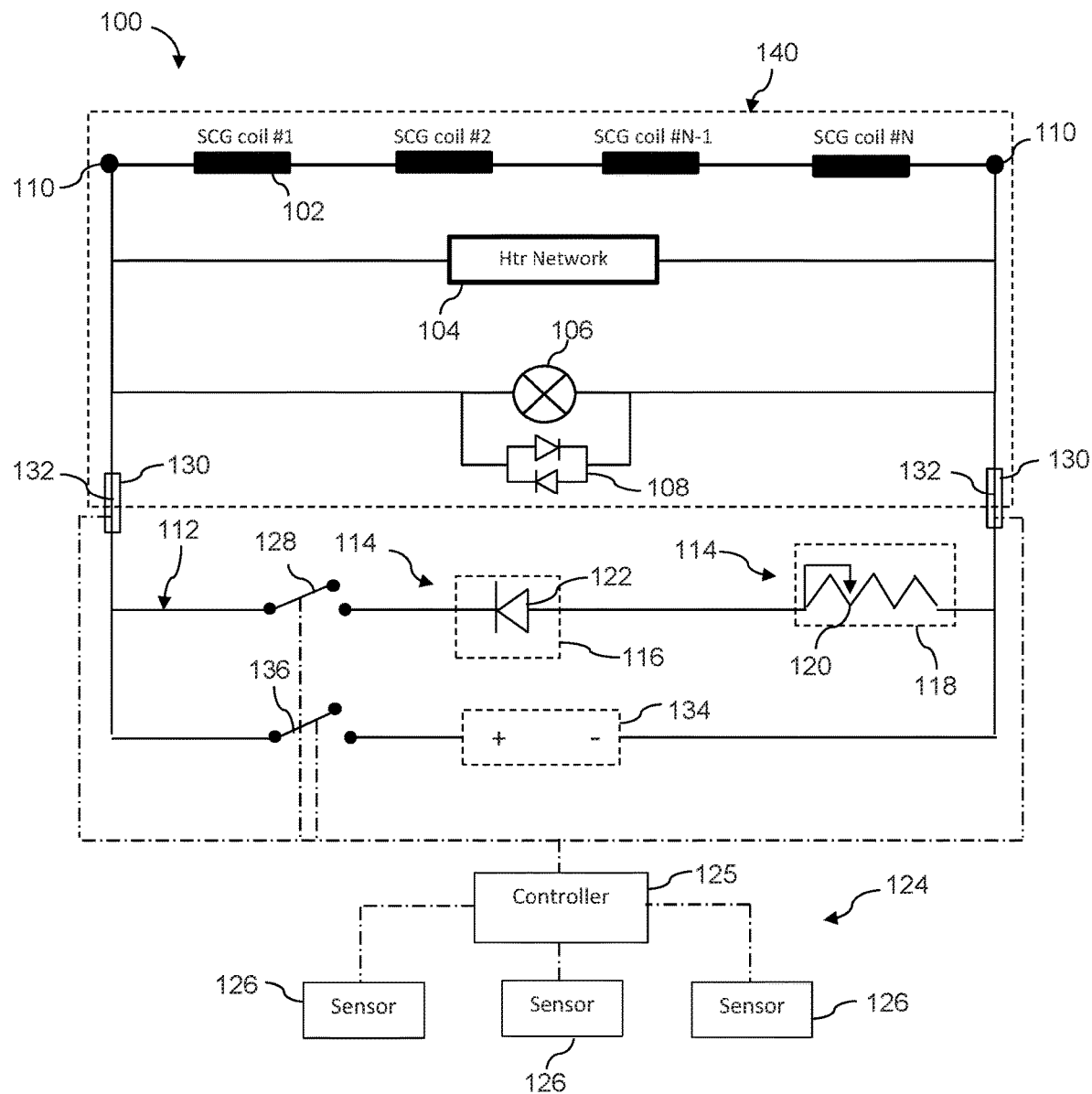
FIG. -3-

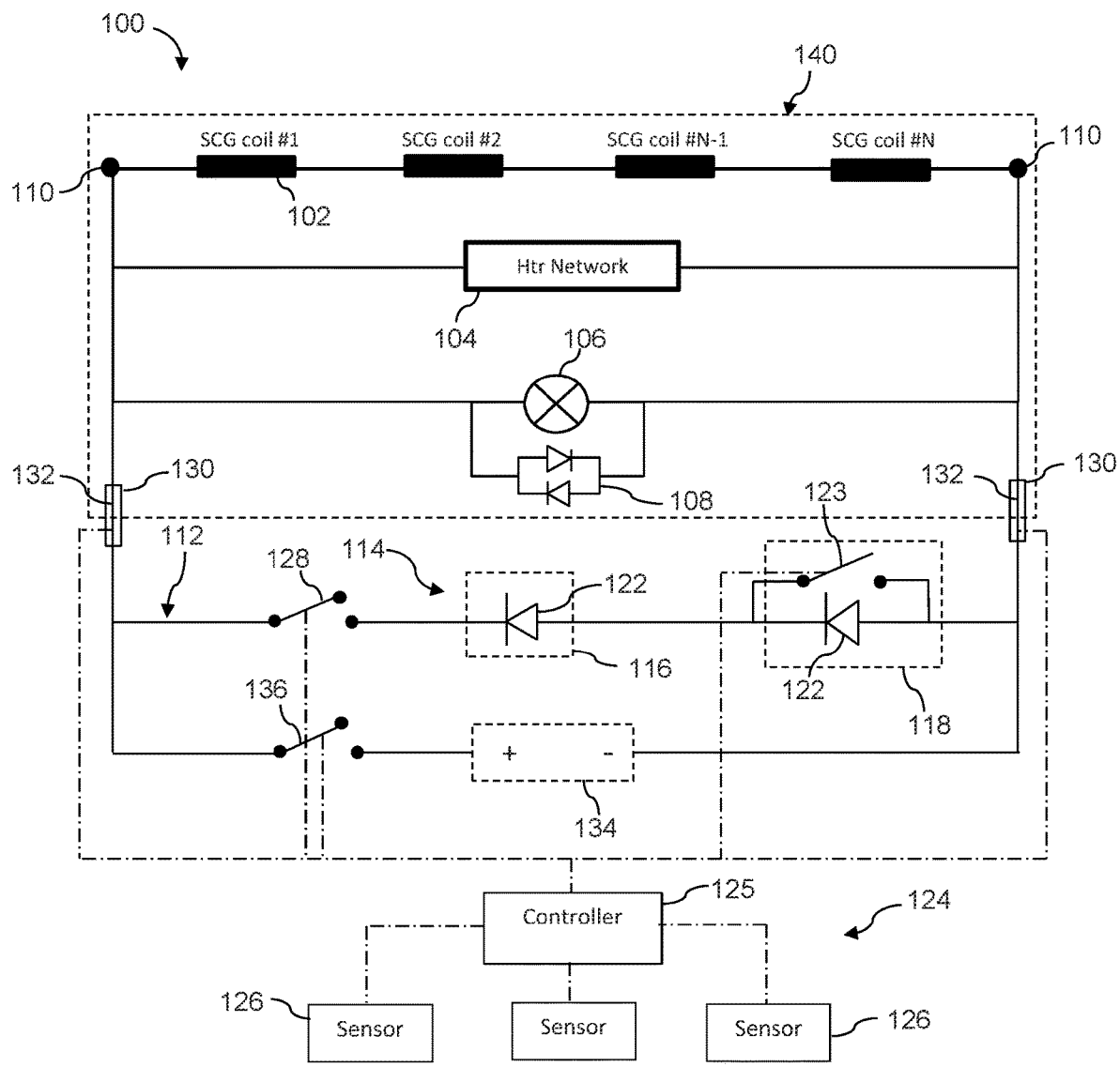
FIG. -4-

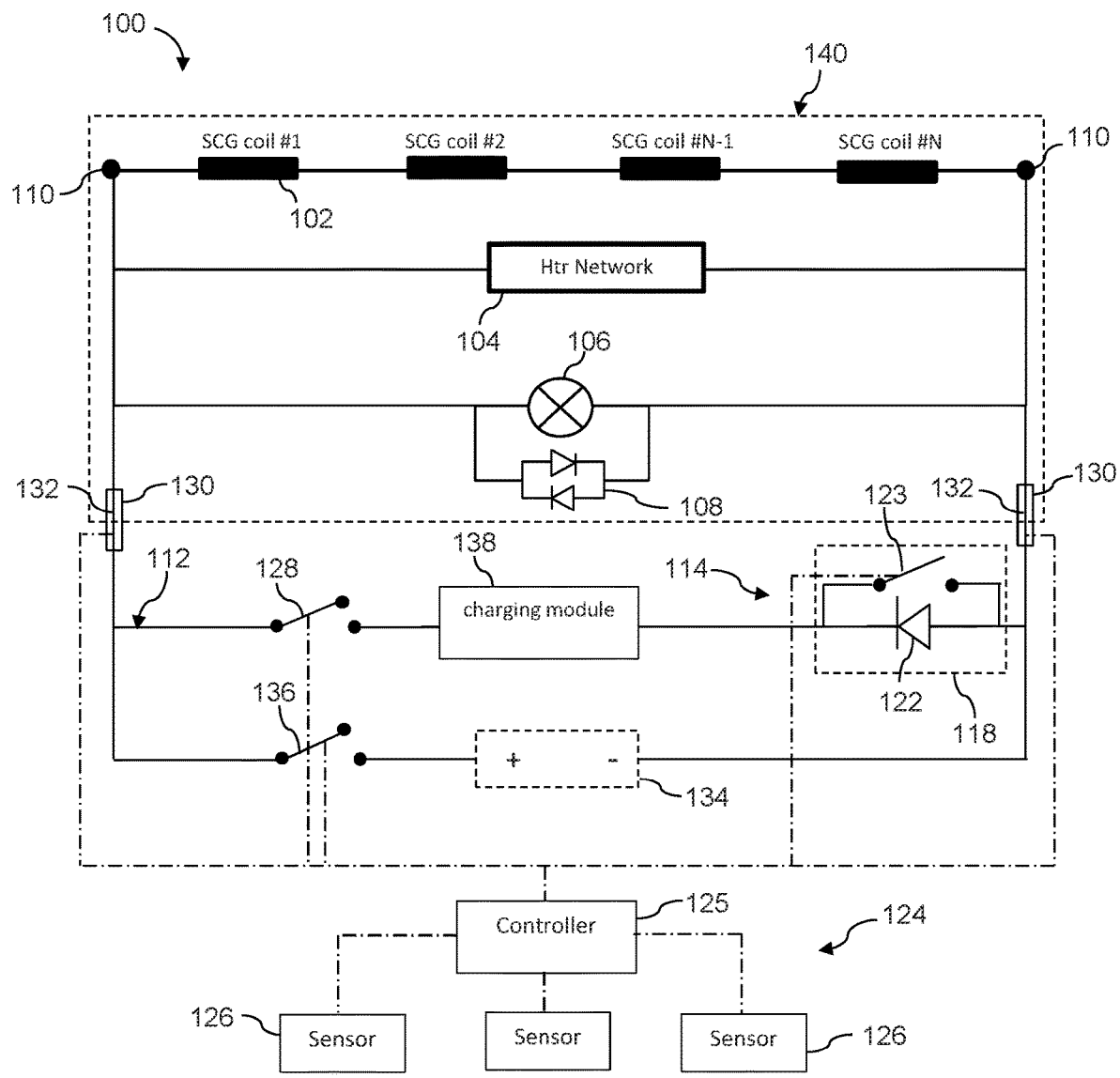
FIG. -5-

SYSTEM AND METHOD FOR AUTO-RAMPING AND ENERGY DUMP FOR A SUPERCONDUCTING WIND TURBINE GENERATOR

FIELD

The present disclosure relates generally to superconducting machines, such as superconducting wind turbine generators, and more particularly to auto-ramp and energy dump capabilities for such machines.

BACKGROUND

Generally, superconducting generators are made by constructing the generator field coils (which typically carry a substantially direct current) of a superconducting material ("superconductor") instead of the usual copper material. Superconductors are typically lighter in weight and smaller in size (e.g., relative to current carrying capacity) than traditional conductors such as copper, and are also more efficient at conducting current (particularly at lower frequencies). Thus, the use of superconductors in power applications, such as wind turbine generators, provides benefits such as more efficient performance, lower generator weight, non-gearbox direct-drive operation, and lower manufacturing and installation costs. Such benefits are particularly for offshore wind turbine applications.

Protection circuits are configured with the superconducting generators to protect the superconducting magnet from damage that could otherwise occur during a quench. A quench occurs when a superconductor reverts to a resistive state as the result of localized heating in one part of the superconductor. When this part ceases to be superconductive, and enters a resistive state, any current flowing through the resistive part will cause local (Joule) heating. This, in turn, causes the adjacent parts of the superconductor to quench, resulting in a larger resistive volume, in turn causing further heating. Thus, in a rapid cascading fashion, the superconductor enters a resistive state, with a potentially very large current still flowing.

For large superconducting wind turbine generators (e.g., in excess of 10 MW), the field coils can retain about 30MJ-50MJ of stored energy. If a quench occurs and the energy is converted into heat in the coils, it can take a significant amount of time to cool the coils with the cryocooler system, in some cases up to 3-4 weeks, before the generator can be restarted. This is a significant down-time period that affects the economics of the wind turbine generator.

The desirability to de-energize the superconducting magnet (field coils) of a superconducting generator or other machine before a quench occurs, for example for maintenance or prior to an outage or other condition that could cause a quench, is known. A "ramping-down" process is implemented wherein current is withdrawn from the coils in a controlled manner and dumped as heat outside of the magnet vacuum vessel and cryocooler system. For example, U.S. Pat. No. 9,874,618 describes a control system for a superconducting magnet in an MRI machine that automatically controls the main power supply, a shimming power supply, and a discharge module to ramp-down the superconducting magnet prior to a quench upon detection of a magnet parameter value that exceeds a threshold value. The discharge module includes a diode stack and resistor that act as loads to draw current from the magnet.

Similarly, U.S. Pat. No. 9,985,426 also describes a control system for an MRI machine wherein a sensor detects an operating parameter of the apparatus and outputs a sensor signal to a magnet controller, which determines if an operating fault (e.g. a power loss to the compressor of a cryocooler) exists in the apparatus. If a fault is detected, the controller connects an energy dump unit across the superconductive coils, which disperses the energy from the coils outside of the cryostat.

The industry would welcome an automatic ramp-down system particularly suited for superconducting wind turbine generators, that can dump the large amount of stored energy in the field coils prior to a quench and reduce the down-time of the generator from weeks to a few days.

BRIEF DESCRIPTION

Aspects and advantages of the invention will be set forth in part in the following description, or may be obvious from the description, or may be learned through practice of the invention.

In accordance with aspects of the present disclosure, an automatic ramp-down system and method are provided for superconducting machines. The invention may have utility for all manner of superconducting machines, such as superconducting generators/motors for ship propulsion, hydrobulbs, etc. It is intended that the invention encompass such uses, and not be limited to any particular type of superconducting machine.

In a particular embodiment of the invention, a wind turbine power generating system is provided that includes a tower, a hub with a plurality of blades connected thereto, and a rotor connected to the hub. A superconducting generator is coupled to the rotor and includes a plurality of superconductive coils. A nacelle is mounted atop the tower, wherein the superconducting generator (and associated systems) is housed within the nacelle. An automatic ramp-down system is configured with the superconducting coils and includes an automatically activated energy dump branch or circuit that withdraws current from the superconductive coils in a ramp-down process prior to a quench. The energy dump circuit includes one or more heat dissipating loads that are mounted in thermal communication with the tower or the nacelle. The tower and nacelle provide a large thermal mass capable of acting as a thermal heat sink for dispersing heat from the loads.

In a particular embodiment, the heat dissipating loads may include any one or combination of a resistive load or diode bank. The resistive load may be variable, for example, a variable resistor.

The energy dump circuit may include a plurality of separate heat dissipating loads that are selectively activated or varied such that a total energy dump capacity of the energy dump circuit can be varied to control the ramp-down rate. For example, the heat dissipating loads may include multiple diode banks that are separately activated (i.e., brought on line) in the energy dump path, or one or more variable resistors, or a combination of the two.

The ramp-down system may include a control system configured with a sensor that detects a parameter indicative of a potential quench. Quenches are caused by various internal operating and external conditions. The monitored parameter may be any one or combination of measurable or detectable characteristic that indicates a quench is imminent at a certain value of the characteristic. For example, one or more of the sensors may be configured to monitor various conditions internal to the superconducting generator, such as magnet/coil temperature, current, cryocooler status/malfunction, etc. and to relay signals representing the monitored parameters to a controller that initiates an automatic ramp-down when the monitored parameter exceeds a stored threshold value. One or more sensors may also be configured to monitor external parameters indicative of a potential quench, such as grid faults, power status, generator operating status, etc., wherein the controller may initiate an automatic ramp-down when the monitored external parameter exceeds a stored threshold value.

The control system may automatically actuate a switch or breaker to bring the energy dump circuit on line upon sensing that the monitored parameter has exceeded the defined value.

In a certain embodiment, retractable leads are used to electronically connect the energy dump circuit to the superconducting coils, wherein the control system is configured to actuate the leads upon the parameter exceeding the defined value.

Alternatively, fixed leads may electrically connect the superconducting coils to a main power supply. The energy dump circuit may include a line breaker in communication with the control system that can be automatically closed by the control system upon the parameter exceeding the defined value.

The present disclosure also encompasses a method for automatic ramp-down of superconducting coils in a superconducting wind turbine power generating system. The method includes detecting an internal or external parameter that is indicative of a potential quench, as discussed above. Upon the parameter exceeding a defined value prior to an actual quench, a ramp-down of the superconducting coils is automatically initiated by electrically connecting an energy dump circuit to the superconducting coils to withdraw current from the superconducting coils. One or more heat dissipating loads are configured in the energy dump circuit in thermal communication with one or both of the wind turbine tower or nacelle, whereby the tower or nacelle act as a large thermal heat sink for dispersing heat from the loads. Metal (e.g., aluminum in particular) structural components of the tower and nacelle are particularly well-suited as thermal heat sinks.

The method may include configuring the heat dissipating loads as any one or combination of a resistive load or diode bank.

The method may also include changing a capacity of individual ones of the heat dissipating loads or number of the heat dissipating loads to vary a total energy dump capacity of the energy dump circuit to control a rate of the ramp-down. For example, the heat dissipating loads may include one or more variable resistors or one or more diode banks that are selectively activated (i.e., brought on line) in the energy dump circuit.

The present disclosure also encompasses an embodiment of a wind turbine power generating system wherein the energy dump circuit includes a charging module that uses the current withdrawn from the superconductive coils as a charging source for a battery used in the wind turbine power generating system. This embodiment may further include one or more heat dissipating loads configured in the energy dump circuit. These loads may, in addition, be mounted in thermal communication with one of the tower or the nacelle that act a thermal heat sink for dispersing heat from the loads.

In the above embodiment, it may be desirable that one or more of the heat dissipating loads is selectively activated or varied within the energy dump circuit such that a charging rate of the charging module is variable.

The method and system of the present invention are also well-suited for an automatic ramp-up process once the magnet/superconductive coils have cooled. This process may include monitoring temperature of the superconductive coils until an acceptable ramp-up temperature is achieved; ensuring a sufficient level of liquid cryogen and proper functioning of the cryocooler; and an electric circuit check. If all conditions are satisfactory, then the control system may auto-engage the retractable current leads (if utilized in the system) to connect the superconducting coils to the external power supply while opening the main switch and turning on the main switch heater.

The external power supply may then be activated to supply ramp-up power. As the superconducting coils are ramping-up, temperature of the main switch and the superconducting coils may be monitored as an input for ramp voltage control.

After the magnet/superconducting coils have ramped-up to full current, ramp-up voltage is reduced and the main switch cools down until it reaches a superconductive state, at which point the main switch is persistent and superconducting coil current flows through the main switch. The external power supply is then turned off, and the current leads (retractable) can be disengaged.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of an embodiment of a wind turbine with a superconducting generator according to the present disclosure;

FIG. 2 is a cross-sectional view of an exemplary superconducting wind turbine generator;

FIG. 3 is a diagram view of an automatic ramp-down system for a superconducting wind turbine generator in accordance with aspects of the invention;

FIG. 4 is a diagram view of a different embodiment of an automatic ramp-down system for a superconducting wind turbine generator; and FIG. 5 is a diagram view of yet another embodiment of an automatic ramp-down system for a superconducting wind turbine generator in accordance with aspects of the invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As mentioned, the present disclosure encompasses the automatic ramp-down system and method utilized with any manner of superconducting machine, and is not limited to superconducting generators. For sake of explanation, the present system and method are described herein with reference to a superconducting generator in general, and more particularly to a wind turbine superconducting generator.

Referring now to the drawings, FIG. 1 illustrates a perspective view of one embodiment of a wind turbine power generating system 10. As shown, the wind turbine power generating system 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 (three are shown) coupled to and extending outwardly from the hub 20. Each rotor blade 22 may be spaced about the hub 20 to facilitate rotating the rotor 18 to enable kinetic energy to be transferred from the wind into usable mechanical energy, and subsequently, electrical energy. For this purpose, the rotor 18 is coupled to a generator 24 via a shaft 26. As an example only, the generator 24 may be a direct-drive superconducting generator.

FIG. 2 illustrates a cross sectional view of an exemplary superconducting generator 24 from FIG. 1. As depicted, the generator 24 includes an outer concentric component 204, which may be the stator, and an inner concentric component 206, which may be the rotor (e.g., in an internal rotor configuration). However, in other embodiments, the outer component 204 may be a rotor of the generator 24, and the inner component 206 may be a stator of the generator 24 (e.g., in an external rotor configuration). A gap (or "air gap") 205 is defined between the outer component 204 and inner component 206 and allows movement (e.g., rotation) therebetween.

The generator 24 also includes a first set of one or more current carrying conductors ("coils") 208 attached to the outer component 204 and a second set of one or more current carrying conductors ("coils") 210 attached to the inner component 206. During operation of the generator 24, these coils 208, 210 are in electromagnetic communication. The coils 208 may be armature coils, and coils 210 may be field coils of the generator 24. Alternatively, the coils 208 may be field coils and the coils 210 may be armature coils of the generator 24. The field coils are connected to a source of excitation current (e.g., an "exciter"), wherein current flow therethrough produces a magnetic field across the field coil, and the armature coil is connected to the output of the generator 24 (e.g., via output terminals) to conduct an output current and electrical power output. Although several coils 208, 210 are depicted, there may be more or less coils 208, 210 and/or windings thereof about the outer component 106 and inner component 208 in various embodiments, e.g., to configure the number of poles of the generator 24 and, thereby, the generating frequency and/or other operating characteristics of the generator 24.

The field coils, e.g., coils 210, are constructed of a superconducting material, such as niobium-titanium (NbTi), niobium-tin (Nb3Sn), or magnesium-boron (MgB2). Typically, the armature coils 208 are constructed from copper. However, in certain embodiments, the armature coils may be constructed of a superconducting material, such as NbTi, Nb3Sn, or MgB2.

FIG. 3 is a diagram of an exemplary an automatic ramp-down system 100 configured with the superconducting coils 102 ("coils") of a superconducting generator, such as the superconducting wind turbine generator 24 discussed above. Within the generator, a superconducting magnet includes a plurality of the coils 102 depicted as SCG coil #1 through SCG coil #N connected in series. A quench protection heater network 104 is associated with the superconducting coils. As understood in the art, the quench protection heater network 104 may be variously configured with the superconducting coils 102 to provide a quench protection functionality. A detailed explanation of this functionality is not necessary for purposes of understanding the present automatic ramp-down system and method.

Leads may be provided to connect the series of coils 102 with a main power supply 134. These leads may be fixed leads 132. Alternatively, the leads may be retractable leads 130. When connected to the main power supply 134, the coils 102 are supplied with a current via ends 110 of the series-arranged coils 102.

A superconductive main switch 106 may be configured in the system 100 in parallel with the coils 102. This main switch 106 may be, for example, a ramping-switch with a superconductive wire portion and a heater portion impregnated in an epoxy. By controlling the heater portion, the wire portion can be switched between a resistive state and a superconductive state. Generally, the main switch 106 is used to "ramp-up" the coils 102 to a persistent superconducting mode and to purposefully "ramp-down" the coils from the persistent mode to a non-persistent superconductive mode.

Switch diodes 108 may be configured across the main switch 106 to limit the voltage across the main switch 106.

When the system 100 is connected to a current source (e.g., main power supply 134) via the leads 130/132 current flows through the coils 102 and the main switch 106. When the magnet/coils 102 are ramped-up to the required current, the main switch 106 becomes superconductive and is closed. As the power supply 134 connected to the leads 130/132 is ramped down, the current through the main switch 106 increases by essentially the same amount as the decrease in the supply current from the power supply 134. Once the external power supply 134 is ramped down completely, the leads 130/132 are disconnected from the external power supply 134. At this point, the superconductive coils 102 are in the persistent operating mode.

A cryocooled system (depicted generally in FIG. 3 as the dashed line box 140 around the coils 102, switch heaters 104, main switch 106, and leads 130/132) may be provided for cooling the coils 102, as known in the art. The cryocooler system 140 (also known as a "cryostat") may include a vacuum chamber housing with a thermal shield. The cryocooled system 104 may include a system whereby liquid helium is circulated within a cooling loop to cool the coils 102 and the thermal shield.

Referring again to FIG. 3, the automatic ramp-down system 100 includes an automatically activated energy dump branch or circuit 112 that withdraws current from the superconductive coils 102 in a ramp-down process prior to a quench. The circuit 112 is "automatically activated" in that manual intervention or initiation is not required. As discussed above, upon a monitored parameter indicative of a pending quench exceeding a define value, a controller will automatically initiate the ramp-down process, as discussed in greater detail below.

The energy dump circuit 112 includes one or more heat dissipating loads 114 that are mounted in thermal communication with the tower or the nacelle. For example, FIG. 3 indicates one of the heat dissipating loads 114 mounted to a component of the tower (i.e., a tower heat sink 116). Another load 114 may be mounted to a tower heat sink 116 or to a component of the nacelle (i.e., a nacelle heat sink 118). Any combination of heat dissipating loads 114 may be mounted to any combination of tower heat sinks 116 and/or nacelle heat sinks 118. The tower and nacelle are generally constructed of materials (e.g., aluminum, steel, or other metals) capable of providing a large thermal mass capable of dispersing heat from the loads 114 and, thus, cooling and preventing a quench of the coils 102.

The heat dissipating loads 114 may include any component that transforms the stored energy (current) of the coils 102 into heat. For example, the heat dissipating loads may be any one or combination of a resistive load 120 or diode bank 122. The resistive load 120 may have a fixed resistance or a variable resistance, as represented by the variable resistor example of the resistive load 120 in FIG. 3. The variable resistor may be controlled by a controller 125 to change the resistance thereof, and thus the heat dissipating capacity of the resistive load.

The energy dump circuit 112 may include one or more separate heat dissipating loads 114 that are selectively activated such that a total energy dump capacity of the energy dump circuit 112 can be changed or varied. This may be desirable in order to control the ramp-down rate. For example, referring to FIG. 4, the heat dissipating loads are depicted as multiple diode banks 122, wherein one or more of the diode banks 122 can be separately activated or brought on line in the energy dump circuit by activation of a switch 123 by a controller 125. It should be appreciated that any number of the fixed heat dissipating loads 114 and variable heat dissipating loads 114 can be configured in the energy dump circuit 112.

For the "automatic" aspect, the ramp-down system 100 may include a control system 124 configured with one or more sensors 126. As discussed above, these sensors are disposed and configured to monitor one or more parameters associated with operation of the wind turbine power generating system that are indicative of a potential quench of the coils 102. Quenches are caused by various internal operating and external conditions. The monitored parameter may be any one or combination of measurable or detectable parameter that indicates a quench is imminent at a certain value or state of the parameter. For example, one or more of the sensors 126 may be configured to monitor various parameters internal to the superconducting generator, such as magnet/coil parameters, for example magnet/coil temperature, current, cryogen pressure, cryocooler status/malfunction, etc., and to relay signals representing the monitored parameters to a controller 125. The controller may initiate an automatic ramp-down when the monitored parameter exceeds a stored threshold value. One or more of the sensors 126 may be configured to monitor external parameters indicative of a potential quench, such as grid faults, power status, generator operating status, etc., wherein the controller 125 may initiate an automatic ramp-down when the monitored external parameter exceeds a stored threshold value.

As indicated by the dashed-line connections in the figures, the control system 124 may automatically actuate a switch or breaker to bring the energy dump circuit 112 on line upon sensing that the monitored parameter has exceeded the defined value. For example, the controller 125 may actuate the retractable leads 130 (if present) to electrically connect the energy dump circuit 112 to the coils 102. At the same time, the controller may actuate a switch 136 to an open state to isolate the power supply from the coils 102.

In an embodiment wherein fixed leads 132 are used, the energy dump circuit 112 may include a switch 128 that is automatically actuated to a closed state by the controller 125, for example at the same time switch 136 is opened.

Referring for example to FIG. 5, an embodiment is depicted wherein the energy dump circuit 112 includes a charging module 138 that uses the current withdrawn from the superconductive coils 102 as a charging source for a battery, which may be a battery used in the wind turbine power generating system. This embodiment may further include any one or more of the heat dissipating loads 114 discussed above with reference to FIGS. 3 and 4 configured in the energy dump circuit 112. As discussed above, these loads 114 may be mounted in thermal communication with a tower heat sink 116 or nacelle heat sink 118 for dispersing heat from the loads.

The heat dissipating loads 114 may be selectively activated or varied, as discussed above with reference to FIGS. 3 and 4, to control the charging rate of the charging module 138.

The present invention also encompasses a method for automatic ramp-down of superconducting coils in a superconducting wind turbine power generating system of the type described above. The method may include monitoring a parameter associated with operation of the wind turbine power generating system that is indicative of a potential quench, such as an internal parameter or and external parameter as discussed above.

Upon the parameter exceeding a defined value prior to a quench, the method automatically initiates a ramp-down of the superconducting coils by electrically connecting an energy dump circuit to the superconducting coils to withdraw current from the superconducting coils.

The method may include configuring one or more heat dissipating loads in the energy dump circuit in thermal communication with a tower heat sink or a nacelle heat sink component such that the tower or nacelle act as a thermal heat sink for dispersing heat from the loads.

The method may include configuring the heat dissipating loads as one or a combination of a resistive load or diode bank.

The method may include changing or varying a number or capacity of the heat dissipating loads in the energy dump circuit to control a rate of the ramp-down. For example, the heat dissipating loads may be configured as any one or combination of a selectively activated diode bank or a variable restive load.

The method may actuate retractable leads to electronically connect the energy dump circuit to the superconducting coils upon the parameter exceeding the predefined value.

Various aspects and embodiments of the present invention are defined by the following numbered clauses:

1. A wind turbine power generating system, comprising:
   a tower;
   a hub, and a plurality of blades connected to the hub;
   a rotor connected to the hub;
   a superconducting generator coupled to the rotor and comprising a plurality of superconductive coils;
   a nacelle mounted atop the tower, the superconducting generator housed within the nacelle;
   an automatic ramp-down system configured with the superconducting coils and comprising an automatically activated energy dump circuit for current withdrawn from the superconductive coils in a ramp-down process prior to a quench; and the energy dump circuit comprising one or more heat dissipating loads, wherein each of the heat dissipating loads is mounted in thermal communication with one of the tower or the nacelle that act a thermal heat sink for dispersing heat from the loads.

2. The wind turbine power generating system as in clause 1, wherein the heat dissipating loads comprise any one or combination of a resistive load or diode bank.

3. The wind turbine power generating system as in any preceding clause, wherein one or more of the heat dissipating loads is configured to be selectively activated or varied within the energy dump circuit to vary a total energy dump capacity of the energy dump circuit.

4. The wind turbine power generating system as in any preceding clause, wherein the heat dissipating loads comprise any one or combination of a diode bank configured to be selectively activated or a variable restive load.

5. The wind turbine power generating system as in any preceding clause, further comprising a control system configured with the automatic ramp-down system, the control system comprising a sensor that monitors a parameter indicative of a quench, the control system actuating a switch to bring the energy dump circuit on line upon the parameter exceeding a defined value.

6. The wind turbine power generating system as in any preceding clause, wherein one or more of the heat dissipating loads is configured to be selectively activated or varied within the energy dump, the control system configured to selectively activate or vary the one or more heat dissipating loads to vary a ramp-down rate of the superconducting coils.

7. The wind turbine power generating system as in any preceding clause, further comprising retractable leads that electronically connect the energy dump circuit to the superconducting coils, the control system configured to actuate the leads upon the parameter exceeding the defined value.

8. The wind turbine power generating system as in any preceding clause, further comprising fixed leads that electronically connect the superconducting coils to a main power supply, the energy dump circuit comprising a switch in communication with the control system, wherein the switch is automatically closed by the control system upon the parameter exceeding the defined value.

9. A method for automatic ramp-down of superconducting coils in a superconducting wind turbine power generating system, comprising:
monitoring a parameter associated with operation of the wind turbine power generating system that is indicative of a potential quench;
upon the parameter exceeding a defined value prior to a quench, automatically initiating a ramp-down of the superconducting coils by electrically connecting an energy dump circuit to the superconducting coils to withdraw current from the superconducting coils; and
configuring one or more heat dissipating loads in the energy dump circuit in thermal communication with a tower or a nacelle component of the wind turbine power generating system such that the tower or nacelle act as a thermal heat sink for dispersing heat from the loads.

10. The method as in clause 9, wherein the heat dissipating loads comprise any one or combination of a resistive load or diode bank.

11. The method as in any one of clauses 9-10, further comprising changing a capacity of the heat dissipating loads such that a total energy dump capacity of the energy dump circuit is variable to control a rate of the ramp-down.

12. The method as in any one of clauses 9-11, wherein the heat dissipating loads comprise any one or combination of a diode bank configured to be selectively activated or a variable restive load.

13. The method as in any one of clauses 9-12, further comprising actuating retractable leads to electronically connect the energy dump circuit to the superconducting coils upon the parameter exceeding the predefined value.

14. A wind turbine power generating system, comprising:
a tower;
a hub, and a plurality of blades connected to the hub;
a rotor connected to the hub;
a superconducting generator coupled to the rotor and comprising a plurality of superconductive coils;
a nacelle mounted atop the tower, the superconducting generator housed within the nacelle;
an automatic ramp-down system configured with the superconducting coils and comprising an automatically activated energy dump circuit for current withdrawn from the superconductive coils in a ramp-down process prior to a quench; and
the energy dump circuit comprising a charging module wherein the withdrawn current from the superconductive coils is used as a charging source for a battery.

15. The wind turbine power generating system as in clause 14, wherein the battery is used in the wind turbine power generating system.

16. The wind turbine power generating system as in any one of clauses 14-15, wherein the energy dump circuit further comprises one or more heat dissipating loads.

17. The wind turbine power generating system as in any one of clauses 14-16, wherein the heat dissipating loads are mounted in thermal communication with one of the tower or the nacelle that act a thermal heat sink for dispersing heat from the loads.

18. The wind turbine power generating system as in any one of clauses 14-17, wherein one or more of the heat dissipating loads is configured to be selectively activated or varied within the energy dump circuit to vary a charging rate of the charging module.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A wind turbine power generating system, comprising:
a tower;
a hub, and a plurality of blades connected to the hub;
a rotor connected to the hub;
a superconducting generator coupled to the rotor and comprising a plurality of superconductive coils;
a nacelle mounted atop the tower, the superconducting generator housed within or attached to the nacelle;
a heater network configured to protect the superconductive coils during a quench;
an automatic ramp-down system configured with the superconducting coils and comprising an automatically activated energy dump circuit separate from the heater network for current withdrawn from the superconductive coils in a ramp-down process prior to the quench; and the energy dump circuit comprising one or more heat dissipating loads, wherein each of the heat dissipating loads is mounted in thermal communication with one of the tower or the nacelle that act a thermal heat sink for dispersing heat from the loads in the ramp-down process prior to the quench.

2. The wind turbine power generating system as in claim 1, wherein the heat dissipating loads comprise any one or combination of a resistive load or diode bank.

3. The wind turbine power generating system as in claim 1, wherein one or more of the heat dissipating loads is configured to be selectively activated or varied within the energy dump circuit to vary a total energy dump capacity of the energy dump circuit.

4. The wind turbine power generating system as in claim 3, wherein the heat dissipating loads comprise any one or combination of a diode bank configured to be selectively activated or a variable restive load.

5. The wind turbine power generating system as in claim 1, further comprising a control system configured with the automatic ramp-down system, the control system comprising a sensor that monitors a parameter indicative of a quench, the control system configured to bring the energy dump circuit on line upon the parameter exceeding a defined value.

6. The wind turbine power generating system as in claim 5, wherein one or more of the heat dissipating loads is configured to be selectively activated or varied within the energy dump, the control system configured to selectively activate or vary the one or more heat dissipating loads to vary a ramp-down rate of the superconducting coils.

7. The wind turbine power generating system as in claim 5, wherein the control system brings the energy dump circuit on line b actuating a plurality of retractable leads to electronically connect the energy dump circuit to the superconducting coils.

8. The wind turbine power generating system as in claim 5, further comprising fixed leads that electronically connect the superconducting coils to the energy dump circuit, the energy dump circuit further comprising a switch in communication with the control system, wherein the switch is automatically closed by the control system upon the parameter exceeding the defined value to electronically connect the energy dump circuit to the superconducting coils.

9. A method for automatic ramp-down of superconducting coils in a superconducting wind turbine power generating system prior to a quench, comprising:

monitoring a parameter associated with operation of the wind turbine power generating system that is indicative of a potential quench;

upon the parameter exceeding a defined value prior to a quench, automatically initiating a ramp-down of the superconducting coils by electrically connecting an energy dump circuit to the superconducting coils to withdraw current from the superconducting coils, the energy dump circuit separate from a heater network configured to protect the superconducting coils during the quench; and configuring one or more heat dissipating loads in the energy dump circuit in thermal communication with a tower or a nacelle component of the wind turbine power generating system such that the tower or nacelle act as a thermal heat sink for dispersing heat from the loads prior to the quench.

10. The method as in claim 9, wherein the heat dissipating loads comprise any one or combination of a resistive load or diode bank.

11. The method as in claim 10, further comprising changing a capacity of the heat dissipating loads such that a total energy dump capacity of the energy dump circuit is variable to control a rate of the ramp-down.

12. The method as in claim 11, wherein the heat dissipating loads comprise any one or combination of a diode bank configured to be selectively activated or a variable restive load.

13. The method as in claim 9, further comprising actuating retractable leads to electronically connect the energy dump circuit to the superconducting coils upon the parameter exceeding the predefined value.

* * * * *